United States Patent
Lin et al.

(10) Patent No.: US 8,711,451 B1
(45) Date of Patent: Apr. 29, 2014

(54) IMAGE CORRECTION METHOD

(71) Applicant: Foxlink Image Technology Co., Ltd., New Taipei (TW)

(72) Inventors: Chun Jen Lin, New Taipei (TW); Yu Hsiang Lee, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 0 days.

(21) Appl. No.: 13/726,419

(22) Filed: Dec. 24, 2012

(51) Int. Cl.
*H04N 1/46* (2006.01)

(52) U.S. Cl.
USPC ........... 358/509; 358/474; 358/475; 358/523; 382/254; 382/162; 382/309

(58) Field of Classification Search
CPC ............ H04N 1/60; H04N 2201/3288; H04N 2201/3298; H04N 1/024; H04N 1/04; H04N 9/12; H04N 1/4097; H04N 1/6019; H04N 5/2175; G06K 9/82; G06K 9/80; G06F 17/30
USPC ......... 358/505, 512, 497, 496, 474, 448, 523, 358/509, 475, 518, 515, 524, 516, 1.9, 1.2, 358/451, 1.17, 3.27, 452, 463, 461; 382/162, 167, 165, 318, 254, 309, 298, 382/294, 128, 274, 305
See application file for complete search history.

(56) References Cited

U.S. PATENT DOCUMENTS

| | | | | |
|---|---|---|---|---|
| 4,739,414 | A * | 4/1988 | Pryor et al. | 358/482 |
| 5,335,082 | A * | 8/1994 | Sable | 347/232 |
| 6,628,248 | B2 * | 9/2003 | Masumoto et al. | 345/32 |
| 7,498,553 | B2 * | 3/2009 | Shimokawa | 250/205 |
| 7,969,626 | B2 * | 6/2011 | Van Mil et al. | 358/505 |
| 8,203,759 | B2 * | 6/2012 | Kato | 358/2.1 |
| 8,208,164 | B2 * | 6/2012 | Yada et al. | 358/1.15 |
| 8,395,807 | B2 * | 3/2013 | Yada et al. | 358/1.18 |

* cited by examiner

*Primary Examiner* — Negussie Worku

(57) ABSTRACT

An image correction method is applied to a scanner device. The scanner device includes a main case, a drive module, an optical module, an analog-to-digital converter, a first-in and first-out data buffer, a data flow control unit, a set unit, a data classification unit and a memory storage unit which are electrically connected and assembled in the main case. The scanner device executes a program statement set by the set unit in the memory storage unit to get values for building an update shading table. The scanner device utilizes the update shading table to compensate pixel values corresponding to red, green and blue light of each scanned line of an image for doing a luminance compensation of image pixels corresponding to the red, green and blue light of each scanned line of the image so as to complete an image correction of each scanned line of the image.

9 Claims, 4 Drawing Sheets

IMAGE CORRECTION METHOD

BACKGROUND OF THE INVENTION

1. Field of the Invention

The present invention generally relates to an image correction method, and more particularly to an image correction method which is applied to a scanner device.

2. The Related Art

Referring to FIG. 1, a conventional image correction method is applied to a scanner device. The scanner device generally includes a main case (not shown), a drive module 10', an optical module 20', an analog-to-digital converter 30' and a memory storage unit 40'. The drive module 10', the optical module 20', the analog-to-digital converter 30' and the memory storage unit 40' are electrically connected and are assembled in the main case. The memory storage unit 40' is capable of moving in the main case. The optical module 20' includes an optical source 201', a lens 202' and an image sensing element 203'. The image sensing element 203' is a charge coupled device (CCD) or a contact image sensor (CIS). A top of the main case is disposed with a scanning platform (not shown).

Usually, when a document is scanned by the scanner device, an image outputted by the scanner device has a non-uniform brightness. In order to make the image has a uniform brightness, the scanner device should correct the image by virtue of the image correction method. Steps of the image correction method are described as follows. At first, position the document which is ready to be scanned on the scanning platform of the scanner device. Then, the drive module 10' drives the optical module 20' to move to begin scanning the document. Specifically, the optical source 201' shines on the document through the scanning platform to reflect a plurality of beams, then the beams are exactly focused on the image sensing element 203' through the lens 202' to form the image, and the image includes a plurality of image pixels. Later, the image pixels are converted into digital signals via the analog-to-digital converter 30'. Again, store the digital signals in a storage area of the memory storage unit 40', and the digital signals are calculated by virtue of applying an interpolation method and a multiplication method so as to build a shading table. At last, the scanner device utilizes the shading table to perform a brightness compensation of the image.

However, in the process of building the above-mentioned shading table to perform the brightness compensation of the image by the image correction method, unpredictable spots or dust on the document will affect the build of the shading table to get an inaccurate shading table and further affect an image correcting effect. Meanwhile, in the process of building the shading table in the storage area of the memory storage unit 40', the storage area of the memory storage unit 40' is without being properly divided into corresponding areas that makes the digital signals irregularly stored in the storage area of the memory storage unit 40'. Thus, the scanner device needs to have the memory storage unit 40' with a larger storage area that increases an image correction cost of the scanner device.

SUMMARY OF THE INVENTION

An object of the present invention is to provide an image correction method applied to a scanner device. The scanner device includes a main case, a drive module, an optical module, an analog-to-digital converter, a first-in and first-out data buffer, a data flow control unit, a set unit, a data classification unit and a memory storage unit which are electrically connected and assembled in the main case. A top of the main case is disposed with a scanning platform. The steps of the image correction method are described hereinafter. Position a document which is ready to be scanned on the scanning platform of the scanner device. The scanner device initializes parameters before scanning the document. The drive module drives the optical module to move to make the scanner device begin scanning the document to form one scanned line of the image which includes a plurality of image pixels corresponding to a red light, a blue light and a green light. The image pixels corresponding to the red light, the green light and the blue light of the one scanned line of the image are converted into digital signals, namely pixel values corresponding to the red light, the green light and the blue light, via the analog-to-digital converter. The first-in and first-out data buffer reads the pixel values corresponding to the red light, the green light and the blue light in sequence, and the set unit sets a program statement in the data flow control unit for getting values which are composed of an update shading table. The pixel values corresponding to the red light, the green light and the blue light of the one scanned line of the image are classified by the data classification unit, and together with the program statement which is set by the set unit are transmitted to the memory storage unit. A storage area of the memory storage unit is divided into a plurality of memory positions for storing values of variables which are needed by the scanner device for executing the program statement set by the set unit. The scanner device judges whether the image is scanned sufficient, if the image is judged to be scanned sufficient, execute the next step, and if the image is scanned insufficient, return to repeat executing the step three, the step four and the step five until the image is judged to be scanned sufficient by the step six. The scanner device executes the program statement set by the set unit in the memory storage unit to get the values for building the update shading table. The scanner device utilizes the update shading table to compensate the pixel values corresponding to the red light, the green light and the blue light of each scanned line of the image for doing a luminance compensation of the image pixels corresponding to the red light, the green light and the blue light of each scanned line of the image so as to complete an image correction of each scanned line of the image.

As described above, in the process of building the update shading table, the scanner device stores the values of the variables which are needed by the scanner device for executing the program statement set by the set unit to the corresponding memory positions of the storage area of the memory storage unit, so that the spots and the dust on the document is eliminated for ensuring the better image effect, and the usage of the storage area of the memory storage unit is decreased for lowering an image correction cost of the scanner device.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
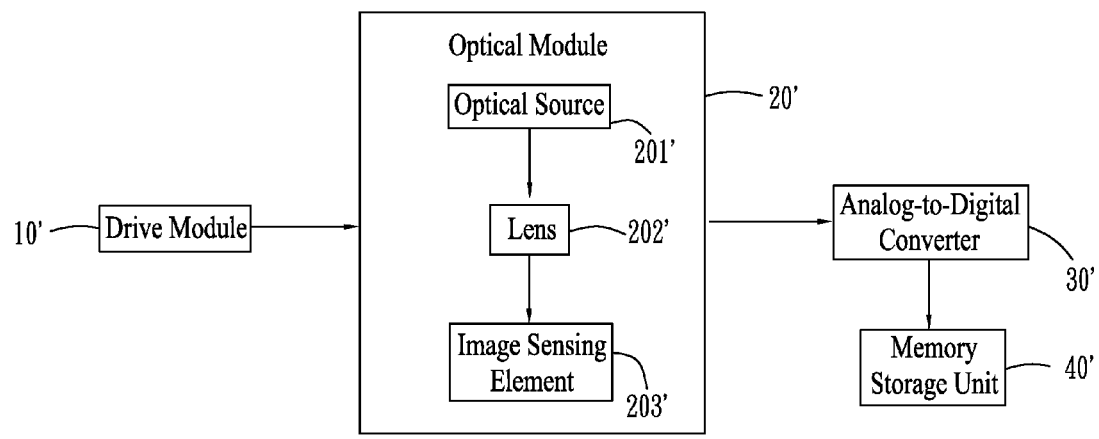
FIG. 1 is a partially schematic block diagram of a scanner device to which a conventional image correction is applied.
Figure 2:
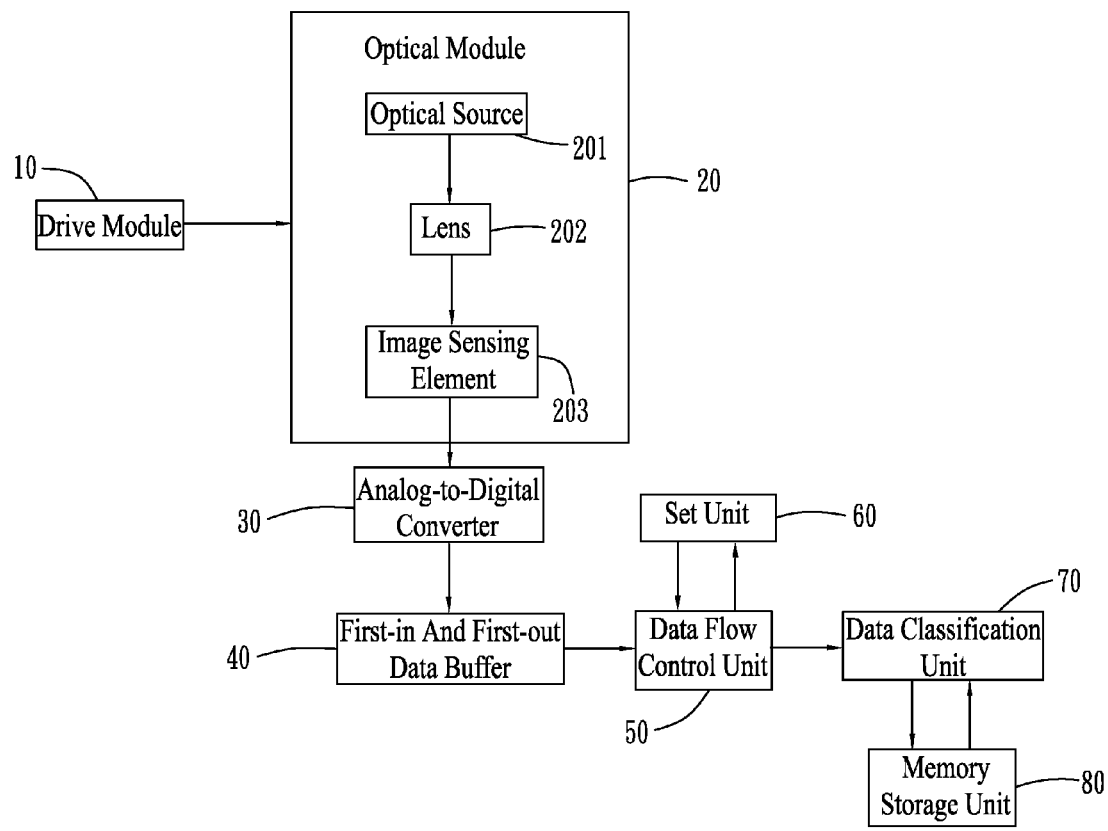
FIG. 2 is a partially schematic block diagram of a scanner device to which an image correction method in accordance with an embodiment of the present invention is applied.

With reference to FIG. 2, an image correction method in accordance with an embodiment of the present invention is applied to a scanner device (not shown). The scanner device is an automatic feed unit type of single double-sided scanner device, a paper feed type of single double-sided scanner device or a platform single scanner device. In this embodiment, the scanner device is the platform single scanner device, and includes a main case (not shown), a drive module 10, an optical module 20, an analog-to-digital converter 30, a first-in and first-out data buffer 40, a data flow control unit 50, a set unit 60, a data classification unit 70 and a memory storage unit 80. The drive module 10, the optical module 20, the analog-to-digital converter 30, the first-in and first-out data buffer 40, the data flow control unit 50, the set unit 60, the data classification unit 70 and the memory storage unit 80 are electrically connected and are assembled in the main case. The optical module 20 is capable of moving in the main case. The optical module 20 includes an optical source 201, a lens 202 and an image sensing element 203. A top of the main case is disposed with a scanning platform (not shown). The optical source 201 is a cold cathode fluorescent lamp (CCFL) or a light emitting diode (LED). The image sensing element 203 is a charge coupled device (CCD) or a contact image sensor (CIS).

Figure 3:
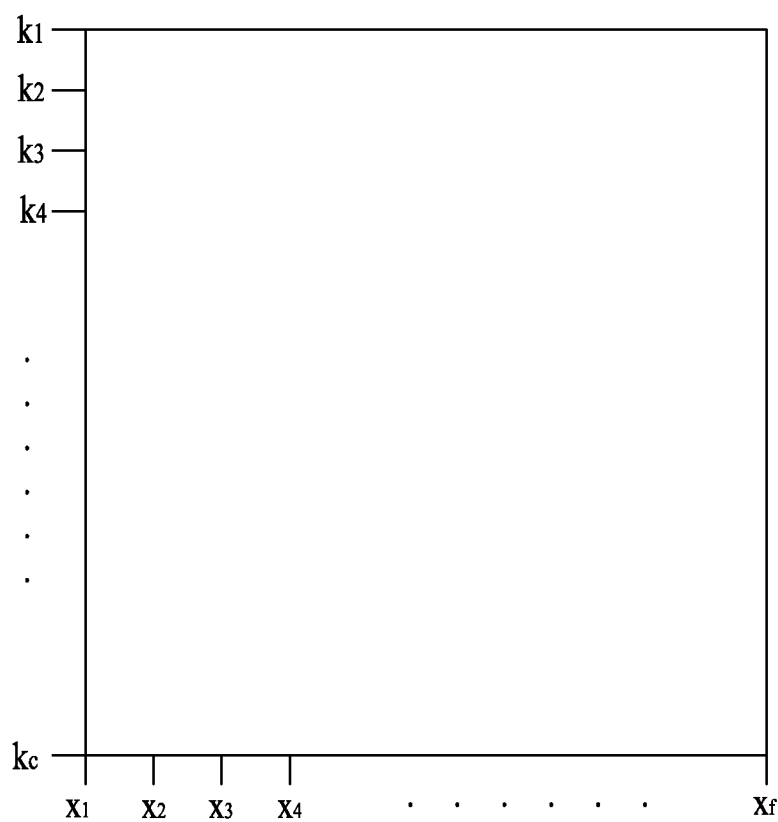
FIG. 3 is an abridged general view of a coordinate axis of a scanning platform of the scanner device of FIG. 2.

Referring to FIG. 2 and FIG. 3, when the scanner device is started to scan a document (not shown), the drive module 10 drives the optical module 20 to move upward along a vertical axis of a coordinate axis of the scanning platform from $k_1$ to $k_c$. In the process of the optical module 20 moving to each position of the vertical axis ($k_1$, $k_2$, $k_3$, $k_4$ ... $k_c$) of the coordinate axis of the scanning platform to scan the document along the vertical axis of the coordinate axis of the scanning platform from $k_1$ to $k_c$, the optical module 20 all scans the document along a horizontal axis of the coordinate axis of the scanning platform from $x_1$ to $x_f$, so that an image which is set by the scanner device to be scanned is got. The image which is set by the scanner device to be scanned includes c scanned lines of the images, namely the kith scanned line, the $k_2$th scanned line, the $k_3$th scanned line, the $k_4$th scanned line ... and the $k_c$th scanned line of the image. Each scanned line of the $k_1$th scanned line, the $k_2$th scanned line, the kith scanned line, the $k_4$th scanned line ... and the $k_c$th scanned line of the image includes f image pixels ($x_1$, $x_2$, $x_3$, $x_4$ ... $x_f$). The image pixels ($x_1$, $x_2$, $x_3$, $x_4$ ... $x_f$) are outputted by the image sensing element 203 of the optical module 20.

Figure 4:
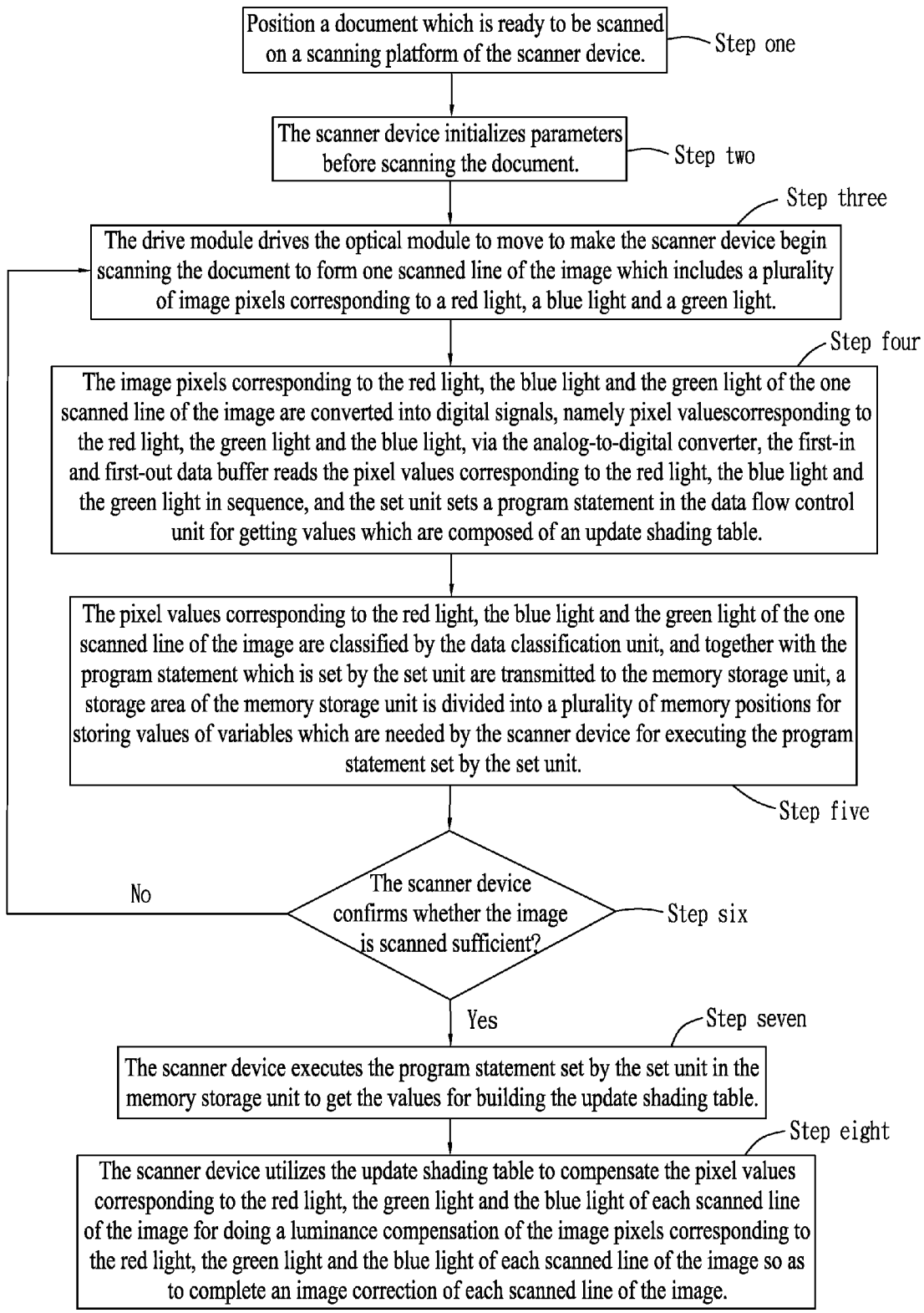
FIG. 4 is a flow chart of the image correction method being applied to the scanner device of FIG. 2.

Referring to FIG. 2, FIG. 3 and FIG. 4, specific steps of the image correction method in accordance with the embodiment of the present invention are described as follows.

Step one: position a document which is ready to be scanned on the scanning platform of the scanner device.

Step two: the scanner device initializes parameters before scanning the document.

Step three: the drive module 10 drives the optical module 20 to move to make the scanner device begin scanning the document to form one scanned line of the image which includes a plurality of image pixels corresponding to a red light, a green light and a blue light.

Step four: the image pixels corresponding to the red light, the green light and the blue light of the one scanned line of the image are converted into digital signals, namely pixel values corresponding to the red light, the green light and the blue light, via the analog-to-digital converter 30, the first-in and first-out data buffer 40 reads the pixel values corresponding to the red light, the green light and the blue light in sequence, and the set unit 60 sets a program statement:

$$WH(x) = \left[ SUM(x) - \sum_{p=0}^{m-1} Lp(x) - \sum_{q=0}^{n-1} Hq(x) \right] \gg k$$

in the data flow control unit 50 for getting values WH(x) which are composed of an update shading table.

Step five: the pixel values corresponding to the red light, the green light and the blue light of the one scanned line of the image are classified by the data classification unit 70, and together with the program statement:

$$WH(x) = \left[ SUM(x) - \sum_{p=0}^{m-1} Lp(x) - \sum_{q=0}^{n-1} Hq(x) \right] \gg k$$

which is set by the set unit 60 are transmitted to the memory storage unit 80, a storage area of the memory storage unit 80 is divided into a plurality of memory positions for storing values of variables SUM(x), Hq(x) and Lp(x) which are needed by the scanner device for executing the program statement:

$$WH(x) = \left[ SUM(x) - \sum_{p=0}^{m-1} Lp(x) - \sum_{q=0}^{n-1} Hq(x) \right] \gg k$$

set by the set unit 60.

Step six: the scanner device judges whether the image is scanned sufficient, if the image is judged to be scanned sufficient, execute the next step, and if the image is scanned insufficient, return to repeat executing the step three, the step four and the step five until the image is judged to be scanned sufficient by the step six.

Step seven, the scanner device executes the program statement:

$$WH(x) = \left[ SUM(x) - \sum_{p=0}^{m-1} Lp(x) - \sum_{q=0}^{n-1} Hq(x) \right] \gg k$$

set by the set unit 60 in the memory storage unit 80 to get the values WH (x) for building the update shading table.

Step eight, the scanner device utilizes the update shading table to compensate the pixel values corresponding to the red light, the green light and the blue light of each scanned line of the image for doing a luminance compensation of the image pixels corresponding to the red light, the green light and the blue light of each scanned line of the image so as to complete an image correction of each scanned line of the image.

Referring to FIG. 2, FIG. 3 and FIG. 4, in the step two, in the process of the scanner device initializing parameters before scanning the document, the set unit 60 sets an initial value of the sum of the xth pixel values corresponding to the red light, the green light and the blue light of all scanned lines of the image is 00000000h in the data flow control unit 50, and the sum of the xth pixel values corresponding to the red light, the green light and the blue light of the all scanned lines of the image is expressed as a variable SUM (x), so the initial value of the variable SUM (x) is shown as: SUM (x)=00000000h, wherein x=$x_1, x_2, x_3, x_4 \ldots x_f$. The set unit 60 sets an initial value of a smallest value of the xth pixel values corresponding to the red light, the green light and the blue light of the all scanned lines of the image is FFFFh in the data flow control unit 50, and the smallest value of the xth pixel values corresponding to the red light, the green light and the blue light of the all scanned lines of the image is expressed as a variable Lp(x), so the initial value of the variable Lp(x) is shown as Lp(x)=FFFFh, wherein p=0 . . . m−1. The set unit 60 sets an initial value of a largest value of the xth pixel values corresponding to the red light, the green light and the blue light of the all scanned lines of the image is 0000h in the data flow control unit 50, and the largest value of the xth pixel values corresponding to the red light, the green light and the blue light of the all scanned lines of the image is expressed as a variable Hq(x), so the initial value of the variable Hq(x) is shown as Hq(x)=0000h, wherein q=0 . . . n−1.

In the step three, the drive module 10 drives the optical module 20 to move upward to make the scanner device begin scanning the document, in specific, the optical source 201 sends out a white light, and the white light penetrates the scanning platform to shine on the document to reflect a plurality of beams, each beam is exactly focused on the image sensing element 203 through the lens 202 to form the one scanned line of the image. The white light is composed of the red light, the green light and the blue light by a certain proportion. So the one scanned line of the image includes a plurality of the image pixels corresponding to the red light, the green light and the blue light.

In the step four, the image pixels corresponding to the red light, the green light and the blue light of the one scanned line of the image are converted into the hexadecimal digital signals, namely the pixel values corresponding to the red light, the green light and the blue light, via the analog-to-digital converter 30. The first-in and first-out data buffer 40 reads the pixel values corresponding to the red light, the green light and the blue light in sequence. The set unit 60 sets the program statement:

$$WH(x) = \left[ SUM(x) - \sum_{p=0}^{m-1} Lp(x) - \sum_{q=0}^{n-1} Hq(x) \right] \gg k$$

in the data flow control unit 50 for calculating the values WH(x) which are composed of the update shading table. The set unit 60 sets another program statement: SUM(x)=SUM(x)+WH_TMPi(x) in the data flow control unit 50 for updating the sum of the xth pixel values of the all scanned lines of the image, namely the value of the variable SUM (x). Wherein WH_TMPi(x) indicates the xth pixel value of each scanned line of the image corresponding to the red light, the green light or the blue light, i is a positive integer and satisfies the relation: 0≤i<$2^k$+m+n; k indicates the kth scanned line of the image; and $k_1, k=k_2, k_3, k_4 \ldots k_c$, m and n are set by the set unit 60.

In the step five, the pixel values corresponding to the red light, the green light and the blue light of the one scanned line of the image are classified by the data classification unit 70, and together with the program statements: SUM(x)=SUM(x)+WH_TMPi(x) and $$WH(x) = \left[ SUM(x) - \sum_{p=0}^{m-1} Lp(x) - \sum_{q=0}^{n-1} Hq(x) \right] \gg k$$

are transmitted to the memory storage unit 80. If the one scanned line of the image is the first scanned line of the image, namely the scanned line of the image, the value of the variable SUM(x) is updated as the xth pixel value corresponding to the red light, the green light or the blue light of the first scanned line, namely the kith scanned line of the image, namely WH_TMPi(x). In the same time, compare the xth pixel value corresponding to the red light, the green light or the blue light of the first scanned line, namely the kith scanned line of the image, namely WH_TMPi(x) with the initial value of the smallest value the xth pixel values of the all scanned lines of the image, namely the value of the variable Lp(x): FFFFh, so the m smallest values of the xth pixel values corresponding to the red light, the green light or the blue light of the first scanned line, namely the kith scanned line of the image, namely the m values of the variables Lp(x) are updated as the m smallest values of the xth pixel values corresponding to the red light, the green light or the blue light of the first scanned line, namely the kith scanned line of the image, namely WH_TMPi(x). Compare the xth pixel value corresponding to the red light, the green light or the blue light of the first scanned line, namely the kith scanned line of the image, namely WH_TMPi(x) with the initial value of the largest value of the xth pixel values of the all scanned lines of the image, namely the value of the variable Hq(x): 0000h, so n largest values of the xth pixel values corresponding to the red light, the green light or the blue light of the first scanned line, namely the kith scanned line of the image, namely the n values of the variables Hq(x) are updated as the n largest values of the xth pixel values corresponding to the red light, the green light or the blue light of the first scanned line, namely the kith scanned line of the image, namely WH_TMPi(x).

If the one scanned line of the image is the kth scanned line of the image, the value of the variable SUM(x) is updated as the sum of the xth pixel values of the k scanned lines (from the kith scanned line to the kth scanned line) of the image corresponding to the red light, the green light or the blue light, namely WH_TMPi(x). In the same time, compare the xth pixel value corresponding to the red light, the green light or the blue light of the kth scanned line of the image, namely WH_TMPi(x) with the xth pixel values of the k−1 scanned lines which are scanned before the kth scanned line of the image, namely WH_TMPi(x), so m smallest values of the xth pixel values corresponding to the red light, the green light or the blue light of the kth scanned line of the image, namely the m values of the variables Lp(x) and the n largest values of the xth pixel values corresponding to the red light, the green light or the blue light of the kth scanned line of the image, namely the n values of the variables Hq(x) are updated.

A storage area of the memory storage unit 80 is divided into q areas (Partition 0 . . . Partition q−1), and each area is divided into a plurality of memory positions. The scanner device analyzes the one scanned line of the image, and stores the sums of the xth pixel values of the all scanned lines of the image, namely the values of the variables SUM (x), the m smallest values of the xth pixel values of the all scanned lines of the image, namely the values of the variables Lp(x), and the n largest values of the xth pixel values of the all scanned lines of the image, namely the values of the variables Hq(x) to the corresponding memory positions of the memory storage unit 80. Specific classified methods of the memory storage unit 80 and specific storage statues of the sum of the xth pixel values of the all scanned lines of the image, namely the values of the variables SUM (x), the m smallest values of the xth pixel values of the all scanned lines of the image, namely the values of the variables Lp(x), and the n largest values of the xth pixel values of the all scanned lines of the image, namely the values of the variables Hq(x) are shown as follows:

Partition 0

| $W_0$ | $W_0+1$ | $W_0+2$ | ... | $W_0+m+2$ | ... | $W_0+m+n+2$ | ... |
|---|---|---|---|---|---|---|---|
| $S_0(31:16)$ | $S_0(15:0)$ | $L_{0,1}$ $L_{0,2}$ $L_{0,3}$ ... $L_{0,m}$ | | $H_{0,1}$ $H_{02}$ $H_{0,3}$ ... $H_{0,n}$ | | $S_1(31:16)$ | ... |

Partition 1

| $W_1$ | $W_1+1$ | $W_1+2$ | ... | $W_1+m+2$ | ... | $W_1+m+n+2$ | ... |
|---|---|---|---|---|---|---|---|
| $S_b(31:16)$ | $S_b(15:0)$ | $L_{b,1}$ $L_{b,2}$ $L_{b,3}$ ... $L_{b,m}$ | | $H_{b,1}$ $H_{b,2}$ $H_{b,3}$ ... $H_{b,n}$ | | $S_{b+1}(31:16)$ | ... |

⋮

Partition q - 1

| $W_{x-1}$ | $W_{x-1}+1$ | $W_{x-2}+2$ | ... | $W_{x-1}+m+2$ | ... | $W_{x-1}+m+n+2$ | ... |
|---|---|---|---|---|---|---|---|
| $S_{qb-b}(31:16)$ | $S_{qb-b}(15:0)$ | $L_{qb-b,1}$ $L_{qb-b,2}$ $L_{qb-b,3}$ ... $L_{qb-b,m}$ | | $H_{qb-b,1}$ $H_{qb-b,2}$ $H_{qb-b,3}$ ... $H_{qb-b,n}$ | | $S_{qb-b+1}(31:16)$ | ... |

30

Wherein W indicates a length of each memory position is a hexadecimal word; S indicates the sum of the xth pixel values corresponding to the red light, the green light or the blue light of the all scanned lines of the image, namely the value of the variable SUM (x); L indicates the smallest value of the xth pixel values corresponding to the red light, the green light or the blue light of the all scanned lines of the image, namely the value of the variable Lp(x); H indicates the largest value of the xth pixel values corresponding to the red light, the green light or the blue light of the all scanned lines of the image, namely the value of the variable Hq(x); b indicates a length of each area; q indicates partition number; m indicates a quantity of the smallest values of the xth pixel values corresponding to the red light, the green light or the blue light of the all scanned lines of the image, namely a quantity of the values of the variable Lp(x); and n indicates a quantity of the largest values of the xth pixel values corresponding to the red light, the green light or the blue light of the all scanned lines of the image, namely a quantity of the values of the variables Hq(x).

In the step six, the scanner device judges whether the image is scanned sufficient, if a quantity of the image pixels of the all scanned lines of the image is more than or equal to a quantity of the image pixels of the image which is set to be scanned by the scanner device: c*f, and a relation: c>m+n should be satisfied, the image is judged to be scanned sufficient, and execute the next step. If the quantity of the image pixels of the all scanned lines of the image is less than the quantity of the image pixels of the image which is set to be scanned by the scanner device: c*f, the image is judged to be scanned insufficient, return to repeat executing the step three, the step four and the step five until the image is judged to be scanned sufficient by the step six, namely, the quantity of the image pixels of the all scanned lines of the image is more than or equal to the quantity of the image pixels of the image which is set to be scanned by the scanner device: c*f, and the relation: c>m+n is satisfied. Wherein the image which is set to be scanned by the scanner device includes c scanned lines of the image; f indicates a quantity of the image pixels outputted by the image sensing element 203 of the optical module 20.

Referring to FIG. 2 and FIG. 3, the image correction method in accordance with the present invention utilizes the aforesaid steps to build the update shading table to complete the image correction of each scanned line of the image one by one, simultaneously, in the process of building the update shading table, the scanner device stores the m smallest values corresponding to the red light, the green light or the blue light of the xth pixel values of the all scanned lines of the image, namely the m values of the variables Lp(x), and the n largest values of the xth pixel values corresponding to the red light, the green light or the blue light of the all scanned lines of the image, namely the n values of the variables Hq(x), in the memory storage unit 80 respectively, so that the spots and the dust on the document are eliminated for ensuring a better image effect. Furthermore, the memory storage unit 80 is divided into q areas, and each area is divided into a plurality of memory positions, the scanner device analyzes the one scanned line of the image, and stores the sum of the xth pixel values of the all scanned lines of the image corresponding to the red light, the green light or the blue light, namely the values of the variables SUM (x), the m smallest values of the xth pixel values of the all scanned lines of the image, namely the m values of the variables Lp(x), and the n largest values of the xth pixel values of the all scanned lines of the image, namely the n values of the variables Hq(x), are stored in the corresponding memory positions of the memory storage unit 80 so as to effectively decrease the usage of the memory storage unit 80.

Referring to FIG. 2 and FIG. 3, preferably, the first-in and first-out data buffer 40, the data flow control unit 50 and the data classification unit 70 are integrated in an application specific integrated circuit (ASIC), so that a software controlling flow of the scanner device is simplified in the process of the scanner device building the update shading table.

As described above, in the process of building the update shading table, the scanner device respectively stores the m smallest values of the xth pixel values corresponding to the red light, the green light or the blue light of the all scanned lines of the image, namely the m values of the variables Lp(x), and the n largest values of the xth pixel values corresponding to the red light, the green light or the blue light of the all scanned lines of the image, namely the n values of the variables Hq(x), in the memory storage unit 80, so that the spots and the dust on the document are eliminated for ensuring the better image effect. Furthermore, the memory storage unit 80 is divided into q areas, and each area is divided into a plurality of memory positions, the sum of the xth pixel values of the all scanned lines of the image, namely the values of the variables SUM (x), the m smallest values of the xth pixel values corresponding to the red light, the green light or the blue light of the all scanned lines of the image, namely the m values of the variables Lp(x), and the n largest values of the xth pixel values corresponding to the red light, the green light or the blue light of the all scanned lines of the image, namely the n values of the variables Hq(x) are stored in the corresponding memory positions of the memory storage unit 80 so as to effectively decrease the usage of the memory storage unit 80. Thus, an image correction cost of the scanner device is lowered.

What is claimed is:

1. An image correction method applied to a scanner device, the scanner device including a main case, a drive module, an optical module, an analog-to-digital converter, a first-in and first-out data buffer, a data flow control unit, a set unit, a data classification unit and a memory storage unit which are electrically connected and assembled in the main case, a top of the main case being disposed with a scanning platform, the image correction method comprising steps of:

positioning a document which is ready to be scanned on the scanning platform of the scanner device;

the scanner device initializing parameters before scanning the document;

the drive module driving the optical module to move to make the scanner device begin scanning the document to form one scanned line of the image which includes a plurality of image pixels corresponding to a red light, a blue light and a green light;

the image pixels corresponding to the red light, the green light and the blue light of the one scanned line of the image being converted into digital signals, namely pixel values corresponding to the red light, the green light and the blue light, via the analog-to-digital converter, the first-in and first-out data buffer reading the pixel values corresponding to the red light, the green light and the blue light in sequence, and the set unit setting a program statement in the data flow control unit for getting values which are composed of an update shading table;

the pixel values corresponding to the red light, the green light and the blue light of the one scanned line of the image being classified by the data classification unit, and together with the program statement which is set by the set unit being transmitted to the memory storage unit, a storage area of the memory storage unit being divided into a plurality of memory positions for storing values of variables which are needed by the scanner device for executing the program statement set by the set unit;

the scanner device judging whether the image is scanned sufficient, if the image being judged to be scanned sufficient, execute the next step, and if the image being scanned insufficient, returning to repeat executing the step three, the step four and the step five until the image is judged to be scanned sufficient by the step six;

the scanner device executing the program statement set by the set unit in the memory storage unit to get the values for building the update shading table; and the scanner device utilizing the update shading table to compensate the pixel values corresponding to the red light, the green light and the blue light of each scanned line of the image for doing a luminance compensation of the image pixels corresponding to the red light, the green light and the blue light of each scanned line of the image so as to complete an image correction of each scanned line of the image.

2. The image correction method as claimed in claim 1, wherein in the process of the scanner device initializing parameters before scanning the document, the set unit sets an initial value of the sum of the xth pixel values corresponding to the red light, the green light and the blue light of all scanned lines of the image which is expressed as a variable SUM (x) is 00000000h in the data flow control unit, wherein $x=x_1, x_2, x_3, x_4 \ldots x_f$, sets an initial value of a smallest value of the xth pixel values corresponding to the red light, the green light and the blue light of the all scanned lines of the image which is expressed as a variable Lp(x) is FFFFh in the data flow control unit, wherein $p=0 \ldots m-1$, and sets an initial value of a largest value of the xth pixel values corresponding to the red light, the green light and the blue light of the all scanned lines of the image is expressed as a variable Hq(x) is 0000h in the data flow control unit, wherein $q=0 \ldots n-1$.

3. The image correction method as claimed in claim 2, wherein the set unit sets the program statement:

$$WH(x) = \left[SUM(x) - \sum_{p=0}^{m-1} Lp(x) - \sum_{q=0}^{n-1} Hq(x)\right] \gg k$$

in the data flow control unit for calculating the values WH(x) which are composed of the update shading table, and the set unit sets another program statement: SUM(x)=SUM(x)+WH_TMPi(x) in the data flow control unit for updating the sum of the xth pixel values of the all scanned lines of the image, namely the value of the variable SUM (x), wherein WH_TMPi(x) indicates the xth pixel value of each scanned line of the image corresponding to the red light, the green light or the blue light, i is a positive integer and satisfies the relation: $0 \leq i < 2^k + m + n$; k indicates the kth scanned line of the image; and $k_1, k=k_2, k_3, k_4 \ldots k_c$, m and n are set by the set unit.

4. The image correction method as claimed in claim 3, wherein the program statements:

$$WH(x) = \left[SUM(x) - \sum_{p=0}^{m-1} Lp(x) - \sum_{q=0}^{n-1} Hq(x)\right] \gg k$$

and SUM(x)=SUM(x)+WH_TMPi(x) are transmitted to the memory storage unit, if the one scanned line of the image is the first scanned line of the image, the value of the variable SUM(x) is updated as the xth pixel value corresponding to the red light, the green light or the blue light of the first scanned line of the image, namely WH_TMPi(x), compare the xth pixel value corresponding to the red light, the green light or the blue light of the first scanned line of the image, namely WH_TMPi(x) with the initial value of the value of the variable Lp(x), so the m smallest values of the values of the variables Lp(x) are updated as the m smallest values of the xth pixel values corresponding to the red light, the green light or the blue light of the first scanned line of the image, namely WH_TMPi(x), compare the xth pixel value corresponding to the red light, the green light or the blue light of the first scanned line of the image, namely WH_TMPi(x) with the initial value of the value of the variable Hq(x), so the n values of the variables Hq(x) are updated as the n largest values of the xth pixel values corresponding to the red light, the green light or the blue light of the first scanned line of the image, namely WH_TMPi(x).

5. The image correction method as claimed in claim 4, wherein if the one scanned line of the image is the kth scanned line of the image, the value of the variable SUM(x) is updated as the sum of the xth pixel values of the k scanned lines of the image corresponding to the red light, the green light or the blue light, namely WH_TMPi(x), compare the xth pixel value corresponding to the red light, the green light or the blue light of the kth scanned line of the image, namely WH_TMPi(x) with the xth pixel values of the k−1 scanned lines which are scanned before the kth scanned line of the image, namely WH_TMPi(x), so the m smallest values of the values of the variables Lp(x) and the n largest values of the values of the variables Hq(x) are updated.

6. The image correction method as claimed in claim 4, wherein the scanner device stores the sums of the xth pixel values of the all scanned lines of the image, namely the values of the variables SUM (x), the m smallest values of the xth pixel values of the all scanned lines of the image, namely the values of the variables Lp(x), and the n largest values of the xth pixel values of the all scanned lines of the image, namely the values of the variables Hq(x) to the corresponding memory positions of the memory storage unit.

7. The image correction method as claimed in claim 3, wherein the scanner device judges whether the image is scanned sufficient, if a quantity of the image pixels of the all scanned lines of the image is more than or equal to a quantity of the image pixels of the image which is set to be scanned by the scanner device: c*f, and a relation: c>m+n is satisfied, the image is judged to be scanned sufficient, and execute the next step, if the quantity of the image pixels of the all scanned lines of the image is less than the quantity of the image pixels of the image which is set to be scanned by the scanner device: c*f, the image is judged to be scanned insufficient, return to repeat executing the step three, the step four and the step five until the image is judged to be scanned sufficient by the step six, namely, the quantity of the image pixels of the all scanned lines of the image is more than or equal to the quantity of the image pixels of the image which is set to be scanned by the scanner device: c*f, and the relation: c>m+n is satisfied, wherein the image which is set to be scanned by the scanner device includes c scanned lines of the image; f indicates a quantity of the image pixels outputted by an image sensing element of the optical module.

8. The image correction method as claimed in claim 3, wherein the scanner device executes the program statement:

$$WH(x) = \left[ SUM(x) - \sum_{p=0}^{m-1} Lp(x) - \sum_{q=0}^{n-1} Hq(x) \right] \gg k$$

set by the set unit in the memory storage unit to get the values WH (x) for building the update shading table.

9. The image correction method as claimed in claim 1, wherein the first-in and first-out data buffer, the data flow control unit and the data classification unit are integrated in an application specific integrated circuit (ASIC).

* * * * *